US012656525B1

(12) United States Patent
Dube et al.

(10) Patent No.: US 12,656,525 B1
(45) Date of Patent: Jun. 16, 2026

(54) TOWED ARRAY TEST ROTATOR PLATFORM

(71) Applicant: The United States of America as represented by the Secretary of the Navy, Newport, RI (US)

(72) Inventors: Olivia M. Dube, Newport, RI (US); Charles K. Boyle, North Kingstown, RI (US); James R. Davey, Newport, RI (US); William H Slater, New Bedford, MA (US); Robert F. Cutler, Tiverton, RI (US)

(73) Assignee: The United States of America as represented by the Secretary of the Navy

( * ) Notice: Subject to any disclaimer, the term of this patent is extended or adjusted under 35 U.S.C. 154(b) by 331 days.

(21) Appl. No.: 18/542,879

(22) Filed: Dec. 18, 2023

(51) Int. Cl.
*G01V 13/00* (2006.01)

(52) U.S. Cl.
CPC ..................................... *G01V 13/00* (2013.01)

(58) Field of Classification Search
CPC . B66F 11/046; E04G 2005/008; E04G 1/362; E04G 2001/158; G01N 2223/303; B63B 27/30; G01V 1/186; G01V 1/307
See application file for complete search history.

(56) References Cited

U.S. PATENT DOCUMENTS

| | | | | | |
|---|---|---|---|---|---|
| 3,859,620 | A | * | 1/1975 | Percy | G10K 11/008 367/13 |
| 4,529,063 | A | * | 7/1985 | Kishi | B66F 11/04 187/244 |
| 4,572,328 | A | * | 2/1986 | Benko | B66F 11/04 182/1 |
| 4,787,111 | A | * | 11/1988 | Pacek | B65G 69/22 49/369 |
| 5,654,937 | A | * | 8/1997 | Striffler | G01V 1/20 367/13 |
| 6,208,584 | B1 | * | 3/2001 | Skinner | G01V 1/186 367/13 |
| 6,405,831 | B1 | * | 6/2002 | Daniel, III | B66F 11/044 182/115 |
| 7,195,106 | B2 | * | 3/2007 | Heynssens | B60P 1/4435 187/244 |
| 8,051,951 | B2 | * | 11/2011 | Bennett | B61K 13/00 182/132 |

(Continued)

*Primary Examiner* — Tran M. Tran
(74) *Attorney, Agent, or Firm* — Jeffry C. Severson

(57) ABSTRACT

A towed array test rotator platform with a catwalk assembly, motor assembly, lower shaft assembly, and cage assembly is provided. The catwalk assembly includes a support base mounted with a guide rail system adjacent to a substantially-central void about which the motor-table assembly is selectively positioned. The lower shaft assembly connects to a drive shaft of the motor assembly and projects coaxially downward through the void into a water-filled tank. With the motor assembly disconnected from the lower shaft assembly and moved away from the void, the motor-table assembly elevates the cage transfer assembly to allow the addition or removal of shaft sections. The cage assembly connects to the lower shaft assembly and carries a towed array being calibrated. Rotational force from the motor through the drive shaft is transferred through the lower shaft assembly to the cage assembly.

11 Claims, 13 Drawing Sheets

(56)         References Cited

U.S. PATENT DOCUMENTS

| | | | | |
|---|---|---|---|---|
| 8,235,126 | B2 * | 8/2012 | Bradley | E21B 41/00 |
| | | | | 166/75.11 |
| 8,708,172 | B2 * | 4/2014 | Kim | B66C 19/002 |
| | | | | 212/87 |
| 9,169,693 | B2 * | 10/2015 | Honeycutt | E06C 1/397 |
| 9,835,764 | B2 * | 12/2017 | Crocker | G01V 13/00 |
| 10,822,818 | B2 * | 11/2020 | Harmon | B66F 11/04 |
| 12,392,607 | B2 * | 8/2025 | Schumacher | B66F 11/042 |
| 12,422,587 | B1 * | 9/2025 | Crocker | G01V 13/00 |
| 2020/0270107 | A1 * | 8/2020 | Hokanson | E04G 1/18 |
| 2025/0198175 | A1 * | 6/2025 | Thomasson | E04G 1/20 |

* cited by examiner 120    131    138    126    136

123

129

139

136

TOWED ARRAY TEST ROTATOR PLATFORM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER APPLICATIONS

None.

BACKGROUND OF THE INVENTION

(1) Field of the Invention

The present invention generally relates to hydrophone line array calibration in a water-filled tank and specifically to a towed array test rotator platform in support of the hydrophone line array calibration.

(2) Description of the Related Art

Towed array systems are used for acoustic sensing within marine environments. Prior to deployment, towed arrays require calibration to ensure proper acoustic sensitivity and sensing capabilities. Past efforts required a large logistical effort to transport arrays for calibration, and/or to configure and operate a towed array calibration environment.

A method of measuring the complex sensitivity of hydrophone data channels across a range of frequencies by using a water-filled tank with proximate boundaries is described by U.S. Pat. No. 9,835,764 to Crocker et al. In the calibration method, a hydrophone array is helically affixed to a test fixture resting on a rotation platform. When the test fixture is submerged in a water-filled tank; the test fixture rotates about a contour of the platform at predetermined time intervals before indexing to a next rotational angle.

Signals transmitted by an acoustic projector in the tank are received on the hydrophones of the line array and the calibrated reference hydrophone. Electrical signals from the reference hydrophone are transmitted over an electrical cable and received by an acoustic data processor for use in calibrating the hydrophone line array. Electrical signals from the hydrophones of the hydrophone line array are also transmitted to the data processor.

A shortcoming is that common test platforms are not designed to allow for test personnel to easily access critical components of the towed array test setup.

Additionally, known calibration solutions require multiple test personnel to be present for long periods of time to manually rotate the test apparatus in small increments, typically by using rope. This method is time consuming and costly, but it can also be inaccurate as the calibration requires rotations in equal segments.

What is needed is a test setup that allows for towed arrays to be tested in-house in a repeatable, accurate, and partially-automated fashion. Also needed is a scalable solution that can calibrate multiple arrays at one time and with a reduced need for human monitoring.

BRIEF SUMMARY OF THE INVENTION

It is therefore a primary object and general purpose of the present invention to provide a rotator platform connectable to a towed array for calibration in a water-filled tank.

To attain the object of the invention, a catwalk assembly, a motor-table assembly, a lower shaft assembly, and a cage assembly are provided. The catwalk assembly includes a support base upon which a guide rail system is mounted and includes structural supports to suspend the catwalk assembly above the water-filled tank. The guide rail system includes one or more sliding tracks positioned along a void disposed substantially central to the support base. The sliding tracks feature locking cars adjustably mounted upon linear rails mechanically fixed along opposite sides of the void.

The motor assembly includes a motor table that houses a power train of a motor operatively connected to an uppermost or drive shaft. A bottom end of the drive shaft presents a drive shaft bearing surface. The motor-table assembly mount slidably to the guide rail system of the catwalk assembly. The guide rail system allows positioning of the motor-table assembly proximate to or separate from the void in the catwalk assembly.

The lower shaft assembly includes one or more shaft sections that connect to a starting end of the drive shaft of the power train. This connection can be achieved using a shaft linkage to fittedly connect to the drive shaft bearing of the drive shaft, and using an outer collar to cover and secure the connection. The shaft sections of the lower shaft assembly project coaxially downward toward the water-filled tank from the drive shaft of the motor-table assembly through the void in the catwalk assembly.

Using the guide rail system to position the motor-table assembly to hold the lower shaft assembly in a hanging position allows adjustment of the length of the assembly through the addition or removal of shaft sections. To facilitate adjustment of the lower shaft assembly; the motor-table assembly is disconnected from the lower shaft assembly and moved away from the void by using the guide rail system.

The cage assembly carries the towed array being calibrated and is constructed as a cylindrical test fixture of parallel positioned hollow circular tubes joined by vertical supports and wrapped in a metal mesh capable of being substantially open to acoustic waves. The height of the cylindrical test feature may be defined by vertical supports.

The cage assembly includes a transfer shaft that mechanically mounts coaxially to a terminating end of the lower shaft assembly (e.g., an end of the joined shaft section(s) opposite the starting end). The transfer shaft may be a welded sleeve that fittedly receives the terminating end of the lower shaft assembly. So assembled, the power train transfers rotational force from the motor through the drive shaft and, in turn, through the shaft sections of the lower shaft assembly to the transfer shaft of the cage assembly.

Calibration of a towed array in a water-filled tank using the rotator platform of the present invention begins by mounting the cage assembly to the lower shaft assembly. With the motor-table assembly positioned separate from the void; the cage assembly is lifted using a shaft lifting assembly into a hanging position above the tank. Additional shaft sections may be added or removed from the lower shaft assembly before the shaft lifting assembly is reattached and used to rehang from the motor-table assembly in order to position the cage assembly at a desired depth in the water-filled tank.

After removing the shaft lifting assembly, the motor assembly is repositioned along the guide rail system to place the drive shaft coaxial with the shaft sections of the lower shaft assembly. After connecting a shaft linkage of the uppermost shaft section and securing this connection with an outer collar; a crane coaxially lifts the connected power train, lower shaft assembly, and cage assembly to free the motor-table assembly.

After the motor-table assembly is repositioned along the guide rail system and separate from the void; the crane coaxially lowers the connected power train, lower shaft assembly, and cage assembly into a hanging position over the tank. The towed array, now submerged in the water-filled tank at a desired depth for test, is rotated by using the power train to transfer rotational force from the motor through the drive shaft and, in turn, through the lower shaft assembly to the cage assembly.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

The towed array test rotator platform of the present invention facilitates calibration of a towed array in a water-filled tank by delivering comparatively-small, incremental turns with automated accuracy. The towed array test rotator platform supports scalability by simultaneously facilitating calibration of multiple towed arrays.

Figure 1:
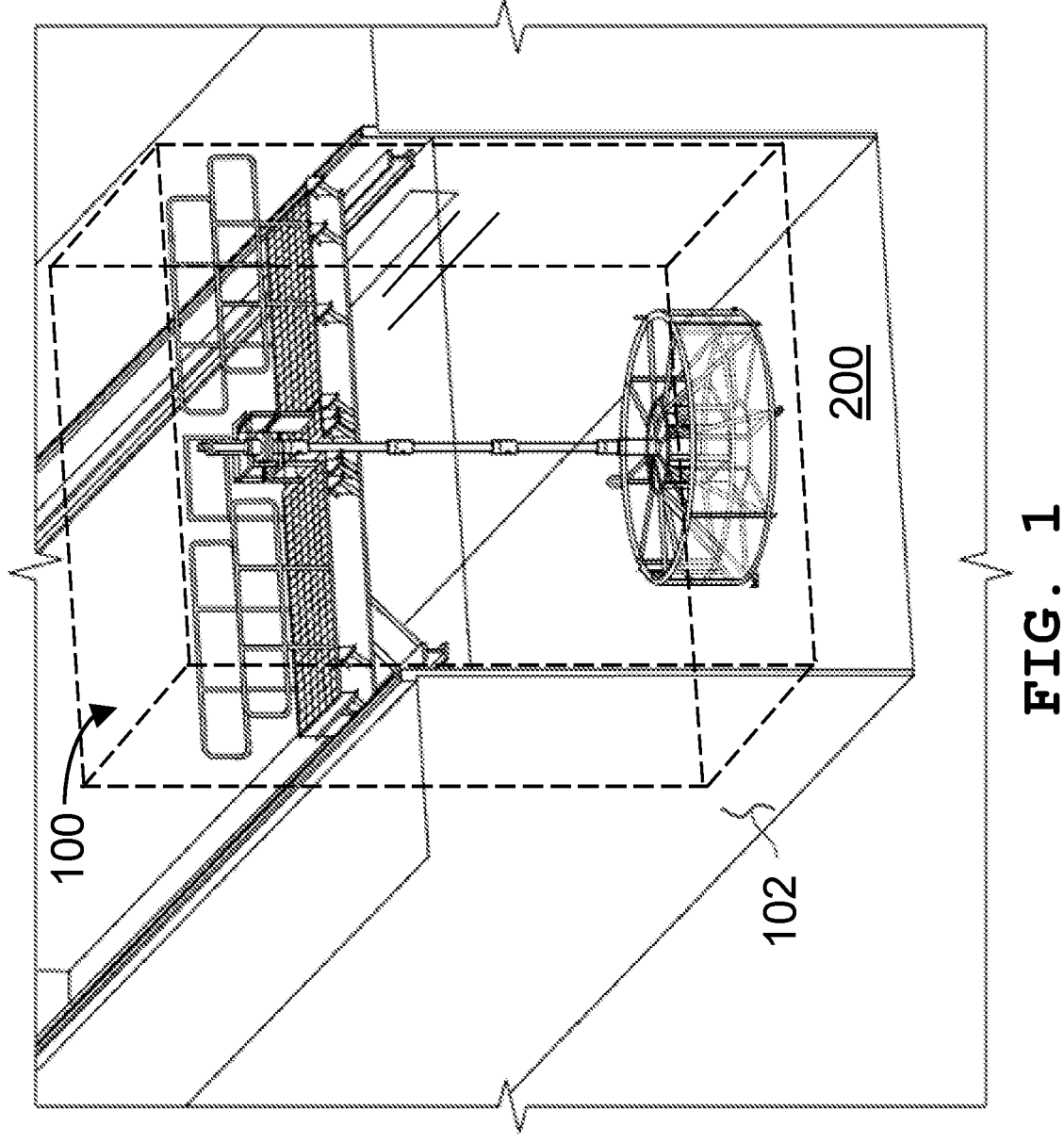
FIG. 1 depicts a top perspective view of a towed array test rotator platform of the present invention operating in a water-filled tank.
Figure 2:
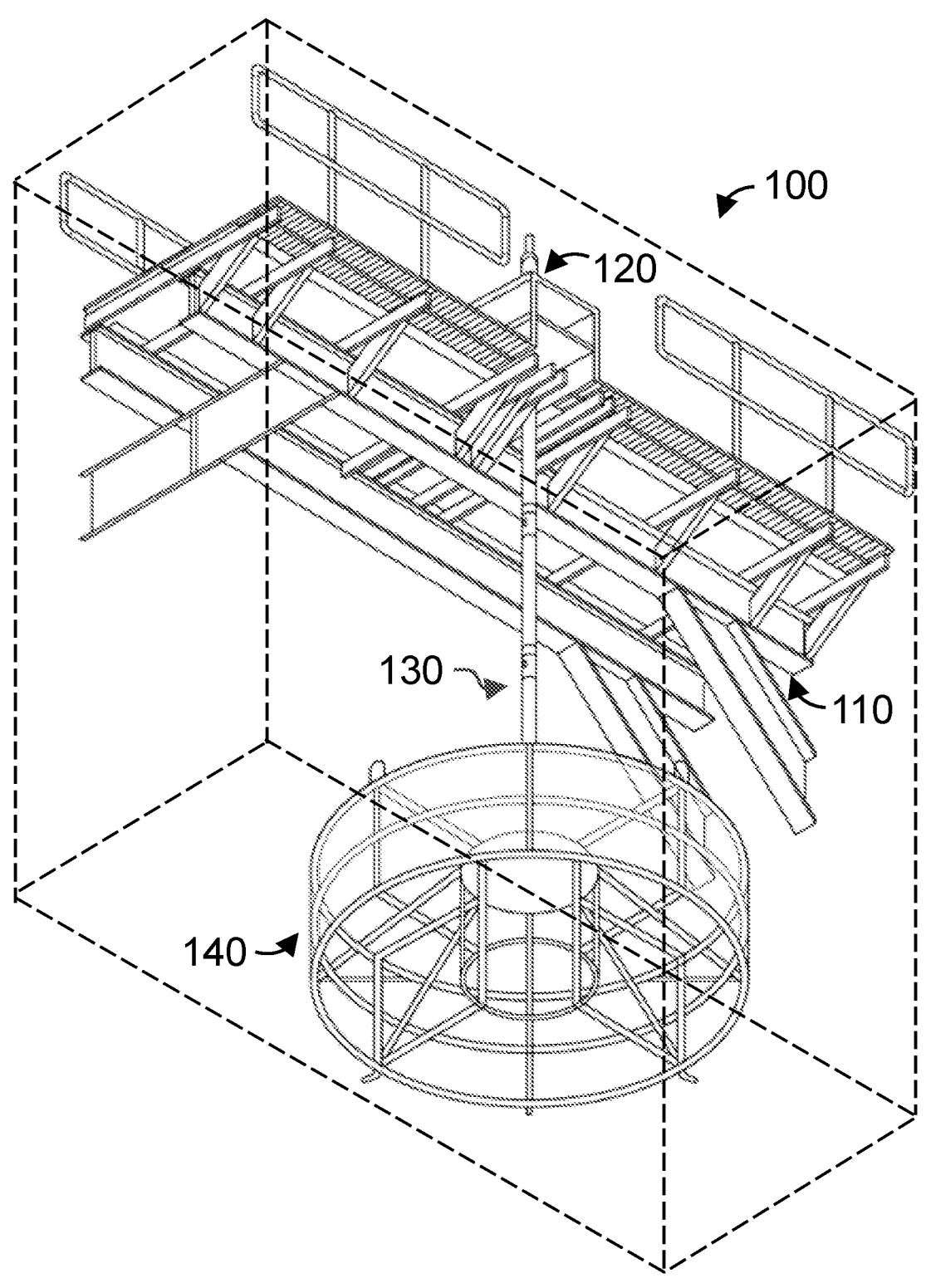
FIG. 2 depicts a bottom perspective view of the towed array test rotator platform of FIG. 1.
Figure 3:
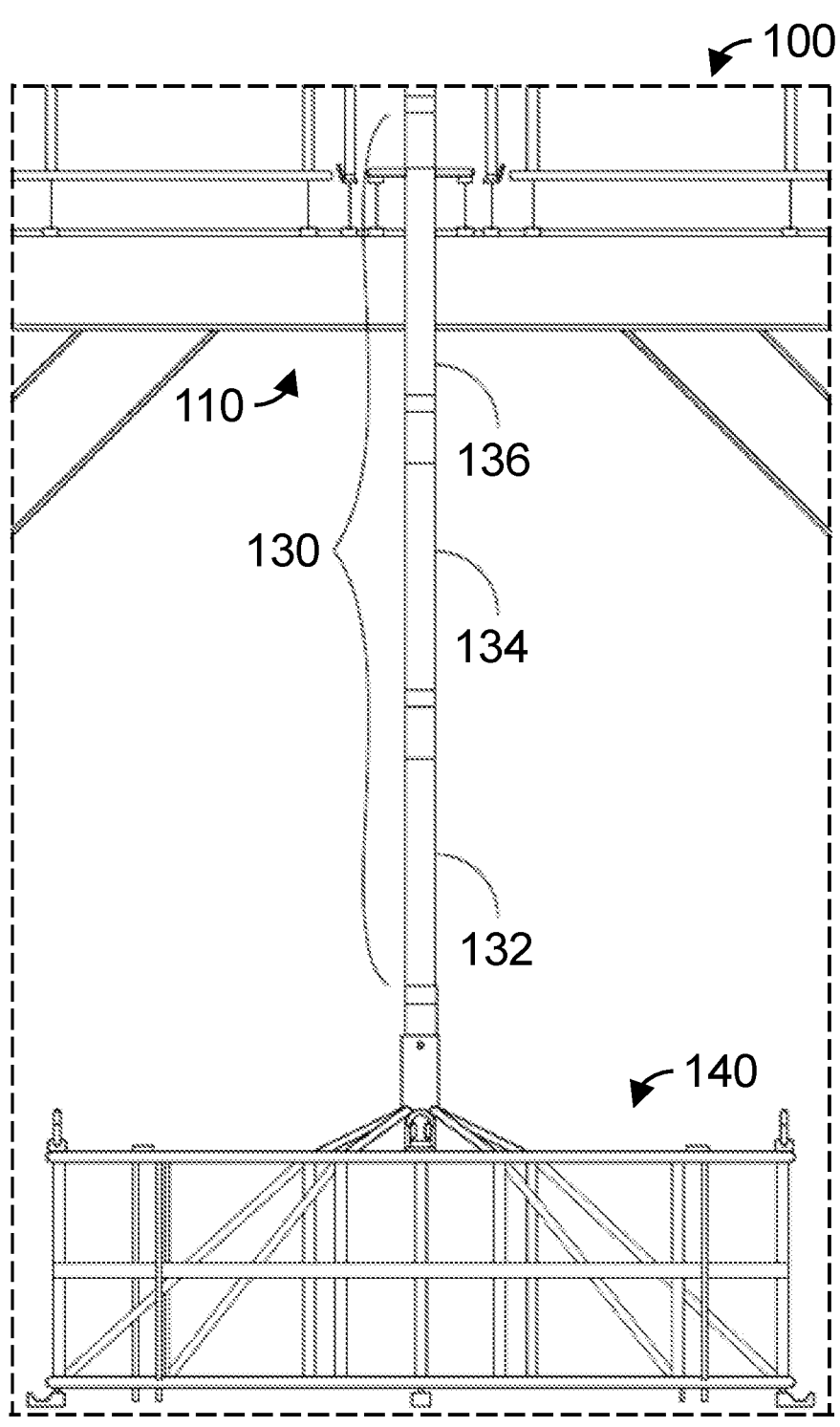
FIG. 3 depicts a front view of the towed array test rotator platform of FIG. 1.

In FIG. 1, FIG. 2 and FIG. 3; a towed array test rotator platform 100 of the present invention is shown. The towed array platform 100 is connectable to a towed array for calibration in a tank 102 filled with water 200. As depicted in FIG. 2 and FIG. 3, the towed array test platform 100 comprises a catwalk assembly 110, a motor-table assembly 120, a lower shaft assembly 130, and a cage assembly 140. The motor-table assembly 120 provides vertical support and a bearing structure for the weight of the lower shaft assembly 130 and the cage assembly 140. The motor-table assembly 120 may adjustably move along the catwalk assembly 110 to engage with the lower shaft assembly 130 for testing and to disengage from the lower shaft assembly for adjustment and/or maintenance of the lower shaft assembly and/or the cage assembly 140.

Figure 4:
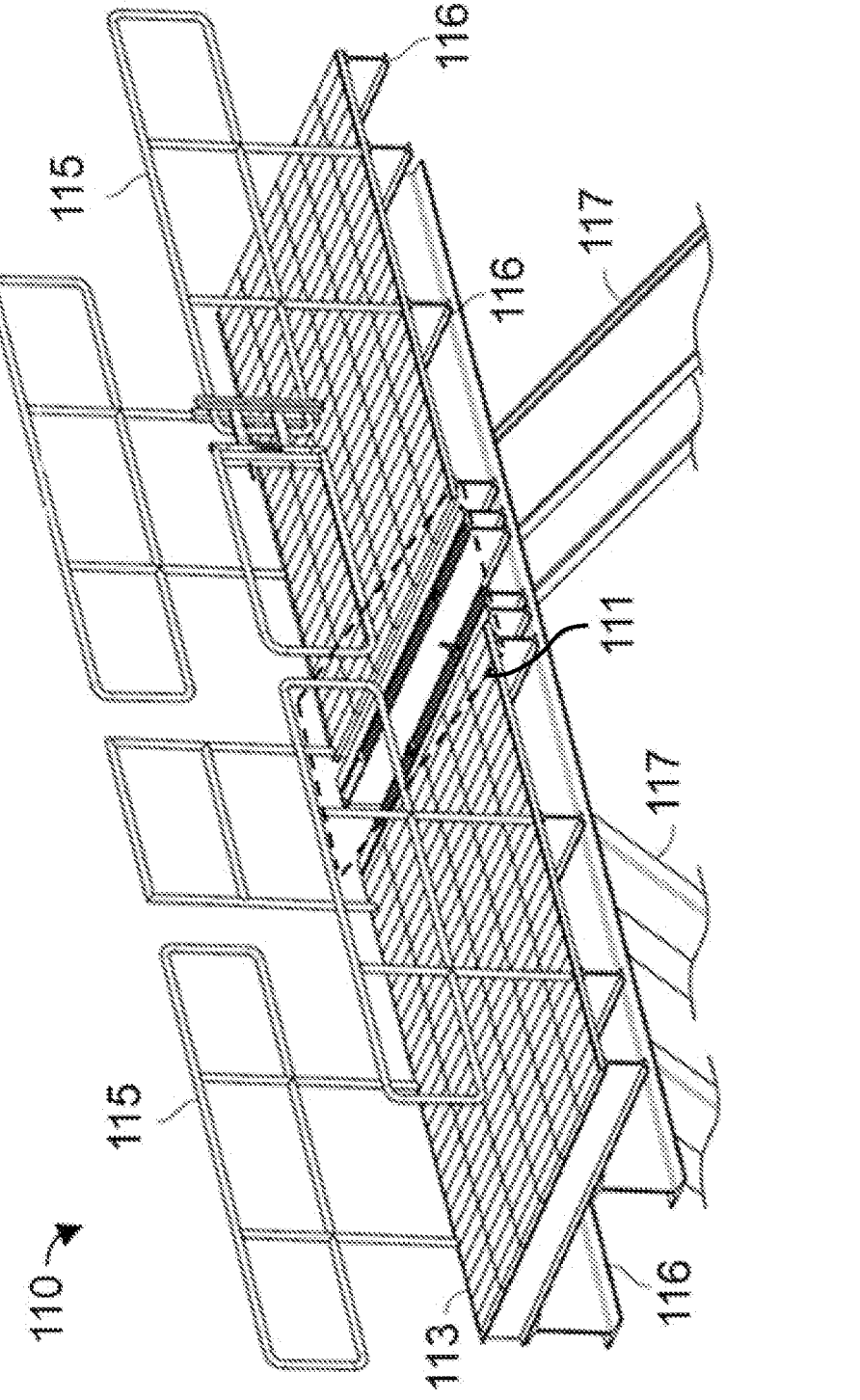
FIG. 4 depicts a top perspective view of a catwalk assembly of the towed array test platform of FIG. 1.

Referring to FIG. 4, the catwalk assembly 110 includes a guide rail system 111 mounted to a support base 113. During a test array calibration setup, the catwalk assembly 110 provides accessibility to critical hardware, maintenance with a user-friendly focus and prioritization of user safety. The support base 113 and railing 115 provide functional and working positions for test personnel.

Structural supports (I-beams 116 or cantilevers 117) suspend the catwalk assembly 110 above the water-filled tank 102, and support the motor-table assembly 120, the lower shaft assembly 130 and the cage assembly 140 including the array under test.

Figure 5:
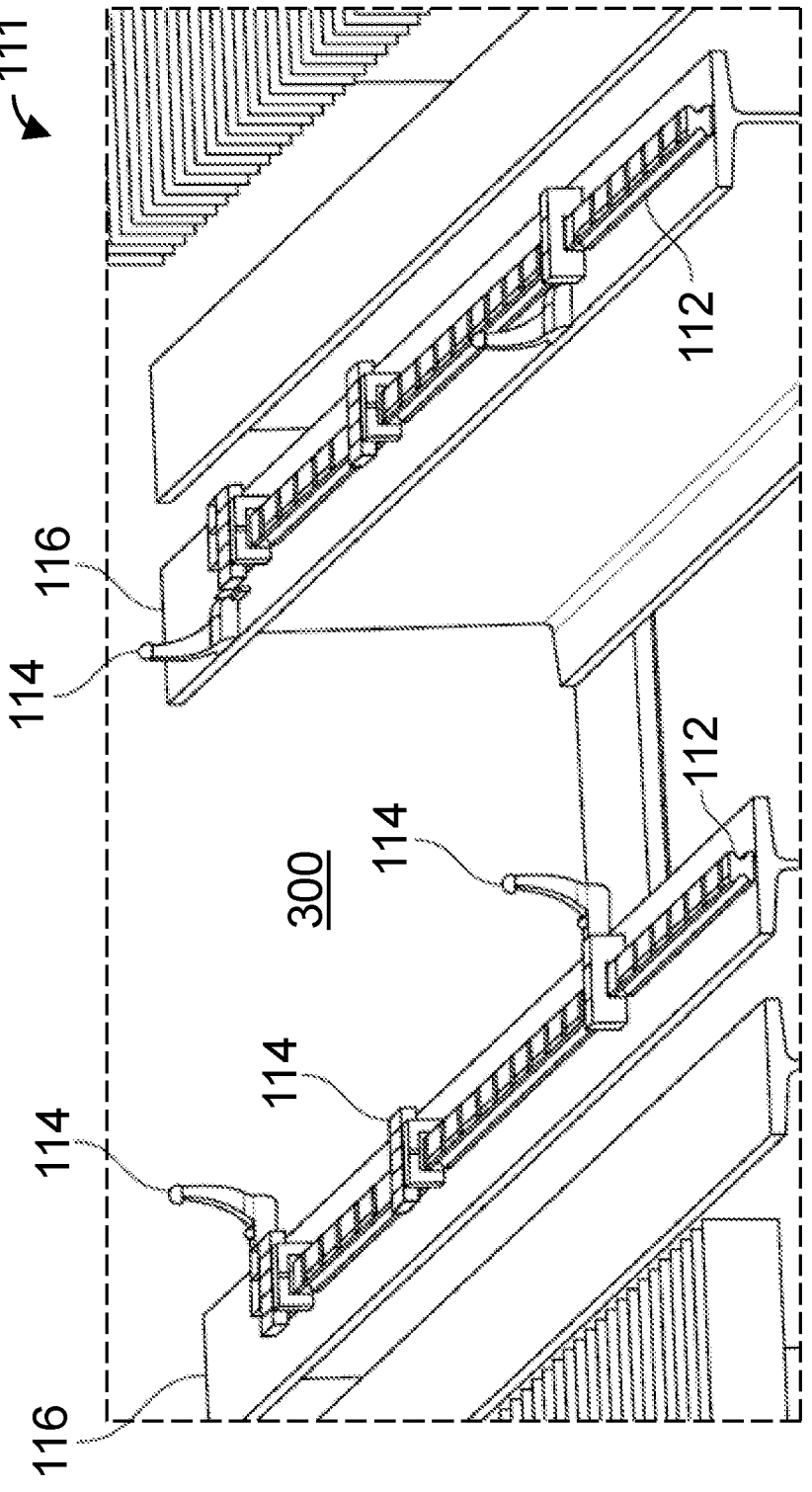
FIG. 5 depicts an enlarged view of a guide rail system of the catwalk assembly of FIG. 4.

Referring to FIG. 5, the guide rail system 111 facilitates movement of the motor-table assembly 120 and related components to facilitate selective engagement and disengagement with the lower shaft assembly 130. The guide rail system 111 is characterized by one or more sliding tracks 112 positioned along a void 300 disposed substantially central to the support base 113.

The sliding tracks 112 may feature locking cars 114 adjustably mounted upon linear rails that are mechanically fixed along opposite sides of the void 300 in the support base 113. The transfer tracks (e.g., linear rails 112 with sliding/locking cars 114) are installed atop spaced beam supports 116 to allow sliding of attached components into and out of position along the void 300.

Figure 6:
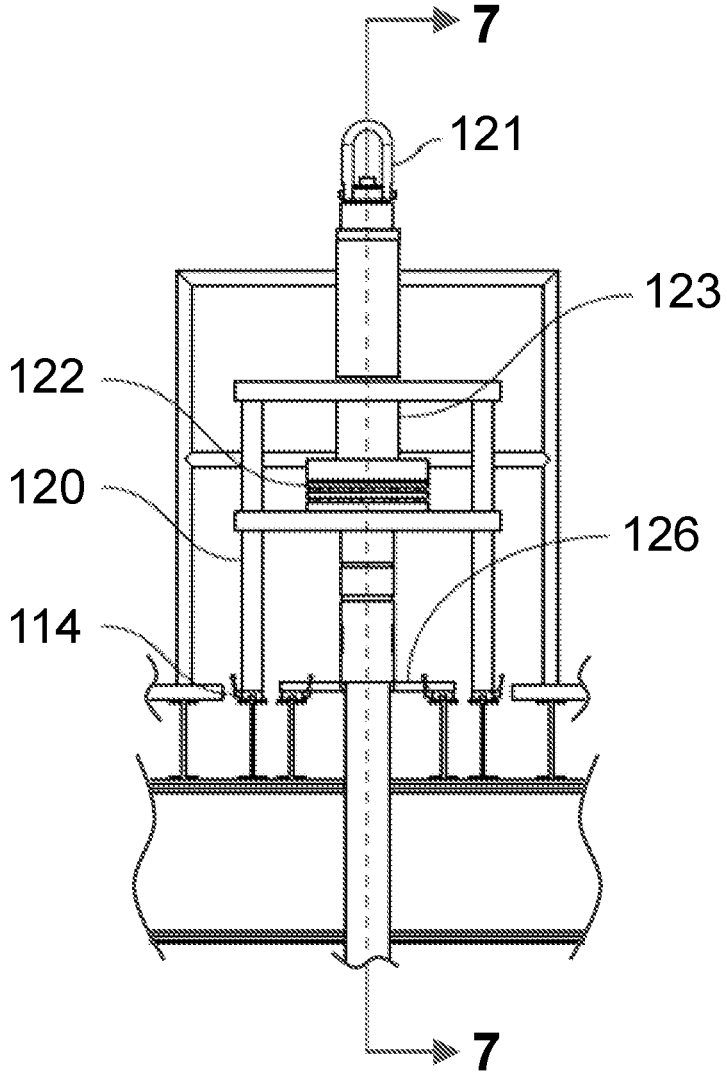
FIG. 6 depicts a front view of a motor assembly of the towed array test rotator platform of FIG. 1.

Referring to FIG. 6, the motor-table assembly 120 houses a power train comprising a motor 122, and a drive shaft 123. The motor 122 (e.g., direct drive type) is operatively connected to the drive shaft 123 and is rated to accommodate a torque incurred by the drive shaft, the lower shaft assembly 130, the cage assembly 140 and the towed array.

The drive shaft 123 is affixed directly to the motor 122 to directly transfer rotational force to the lower shaft assembly 130 as connected to a bottom end of the drive shaft (through a drive shaft bearing surface 129).

Figure 7:
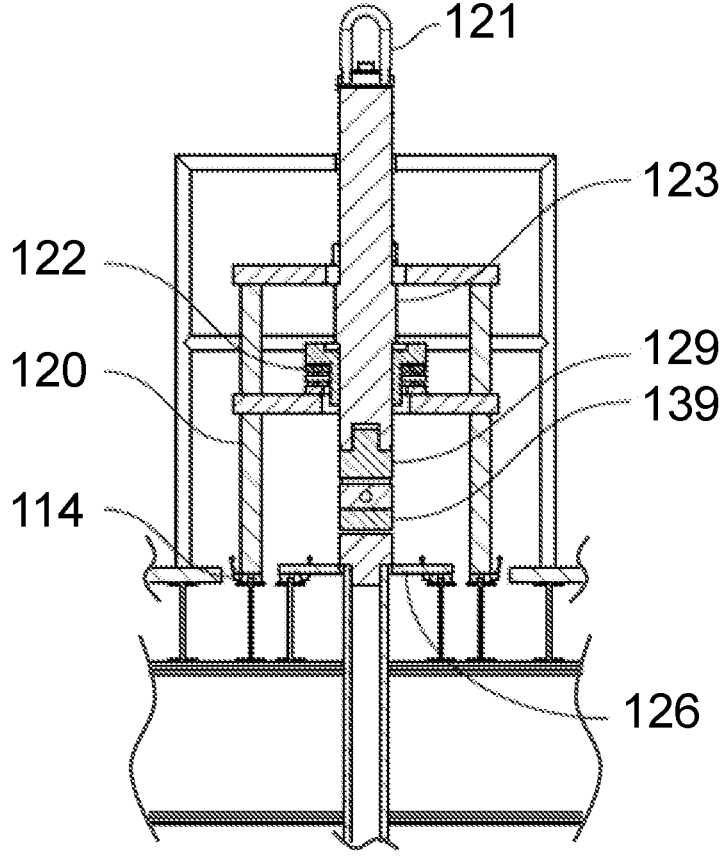
FIG. 7 depicts a cross-section view of the motor assembly of FIG. 6 with the view taken along reference lines 7-7 of FIG. 6.

The motor-table assembly 120 mounts slidably to the guide rail system 111 of the catwalk assembly 110. The guide rail system 111 allows selective positioning of the motor-table assembly 120 (e.g., along an outer pair of the linear rails 112), of the support table (e.g., along an inner pair of the linear rails 112), and/or of both either proximate to or separate from the void 300. For example, as shown in FIG. 7, the motor-table assembly 120 can slide along the guide rail system 111 for easy attachment and removal of components (e.g., lower shaft assembly 130) to the power train carried by the motor table.

Referring additionally to FIG. 3, sections of shaft length 132, 134, 136 can be added or removed from the lower shaft assembly 130 to place the towed array being calibrated (as carried by the cage assembly 140) at a desired height in the test tank 102. This flexibility allows for tailored individual test sets and for multiple test sets both to be conducted with increased functionality using the present invention.

The lower shaft assembly 130 includes an uppermost shaft section 136 that mechanically connects at a starting end to the drive shaft 123 of the power train. This connection uses a shaft linkage 139 to fittedly connect to the drive shaft bearing 129 of the drive shaft 123. In certain embodiments, each shaft linkage 139 is a coupling feature with both alignment pins and a keyed cutout for transferring torque and weight. Such coupling with shaft linkages 139 may be augmented using outer clamps (e.g., collars 138) to hold the shaft linkages tightly in their pinned, keyed position. Once connected, the shaft section(s) 132, 134, 136 of the lower shaft assembly 130 project coaxially downward from the drive shaft 123 of the motor-table assembly 120 through the void 300 in the catwalk assembly 110.

This capability to selectively add and remove shaft sections 132, 134, 136 in the lower shaft assembly 130 advantageously allows for a change in towed array height (e.g., the position of the cage assembly 140) with respect to the water 200 in the test tank 102.

Using the guide rail system 111 to position the motor-table assembly 120 in order to hold the lower shaft assembly 130 in a hanging position allows adjustment of lower shaft assembly 130 length through the addition or removal of shaft sections 132, 134, 136. To facilitate unencumbered adjustment of the lower shaft assembly 130, the motor-table assembly 120 is disconnected from the lower shaft assembly and moved away from the void 300 using the guide rail system 111.

Figure 8:
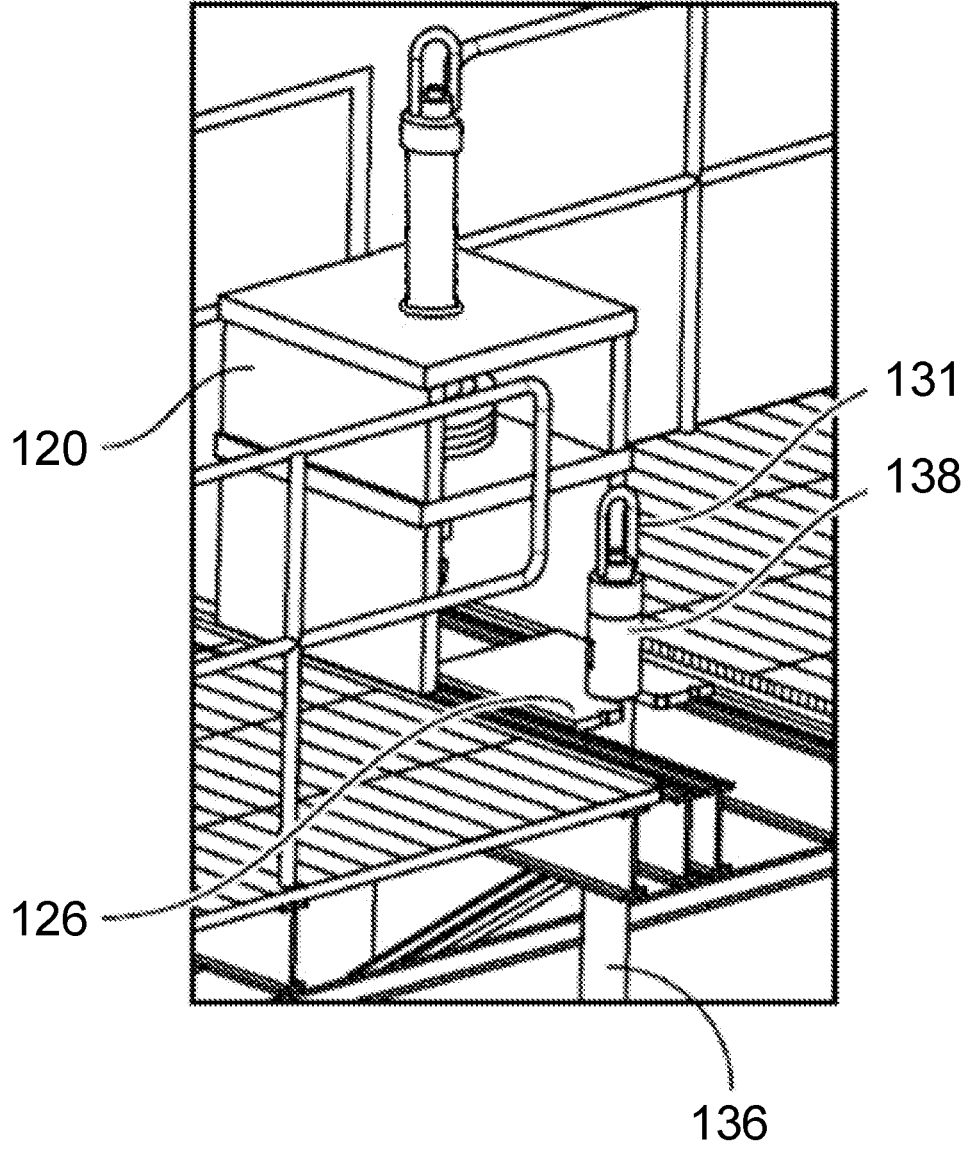
FIG. 8 depicts a connection of a motor assembly with a lower shaft assembly of the towed array test rotator platform of FIG. 1.

As shown in FIG. 8, with the motor-table assembly 120 moved away from the void 300 using the guide rail system 111, the uppermost shaft section 136 is set on the motor-table assembly 120 using a shaft lifting assembly 131 hung from an overhead crane (not shown). Once the lower shaft assembly 130 is secured in a hanging position; the shaft lifting assembly 131 is removed.

Figure 9:
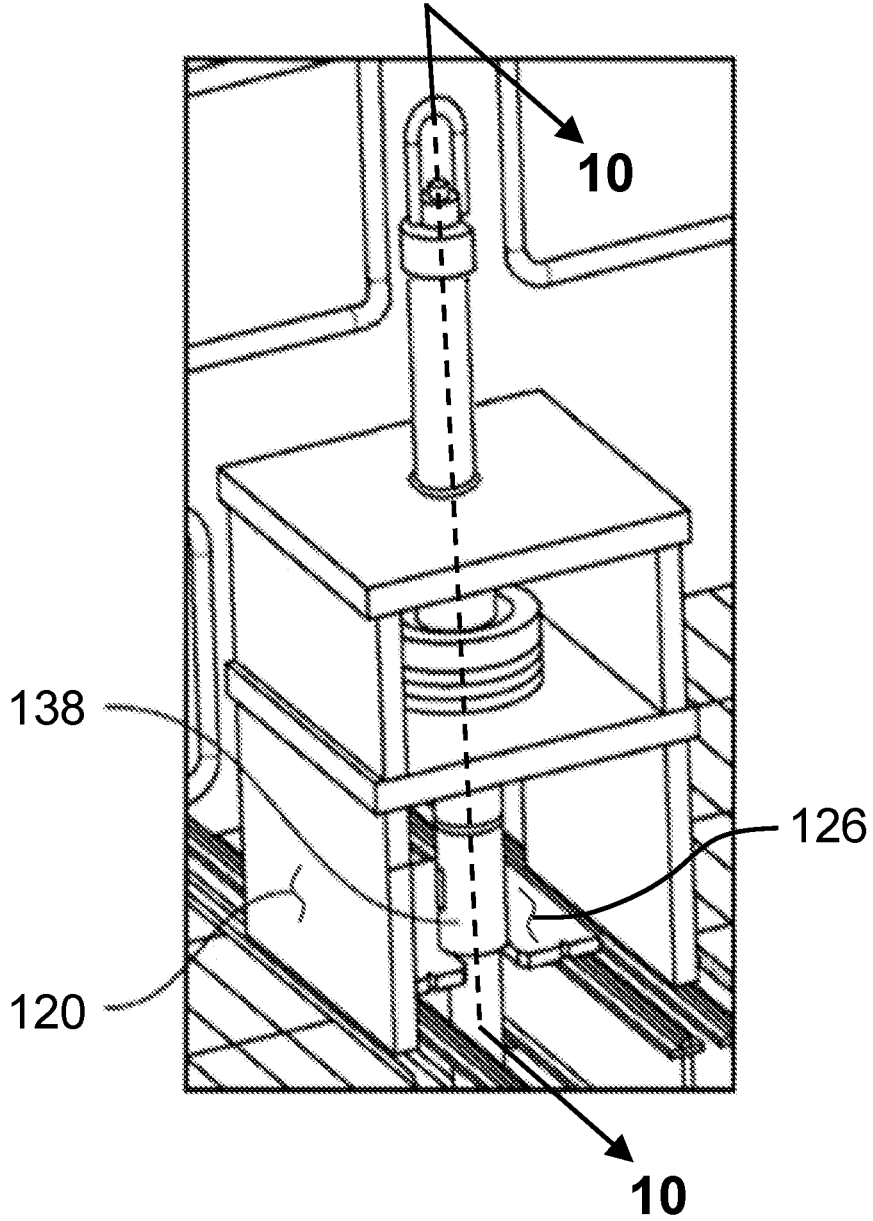
FIG. 9 depicts a close-up view of a connection of a motor assembly with a lower shaft.
Figure 10:
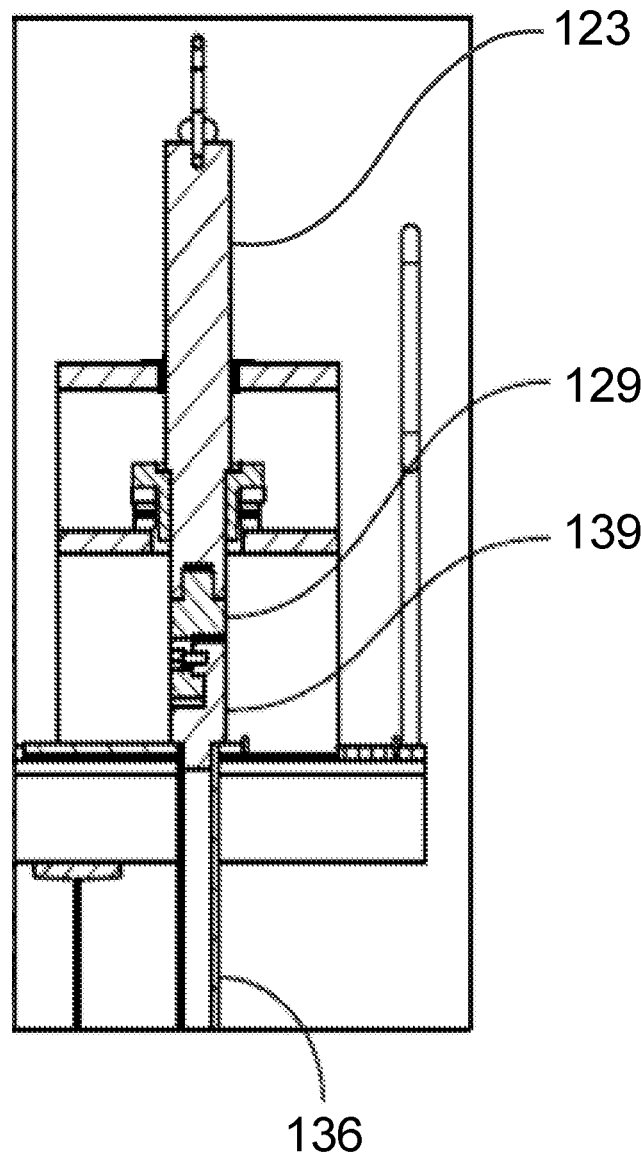
FIG. 10 depicts a cross-section view of the motor assembly with the view taken along reference lines 10-10 of FIG. 9.

As shown in FIG. 9 and FIG. 10, the motor-table assembly 120 is slid back along the guide rail system 111 to a position over the lower shaft assembly 130 with the motor-table assembly 120 still in place (as shown, the drive shaft 123 is positioned above the void 300 and coaxial with the uppermost shaft section 136). The drive shaft bearing surface 129 is then aligned with the complementary shaft linkage surface 139, and mechanically fixed (e.g., with a pin) to rotatably join the power train with the lower shaft assembly 130.

Figure 11:
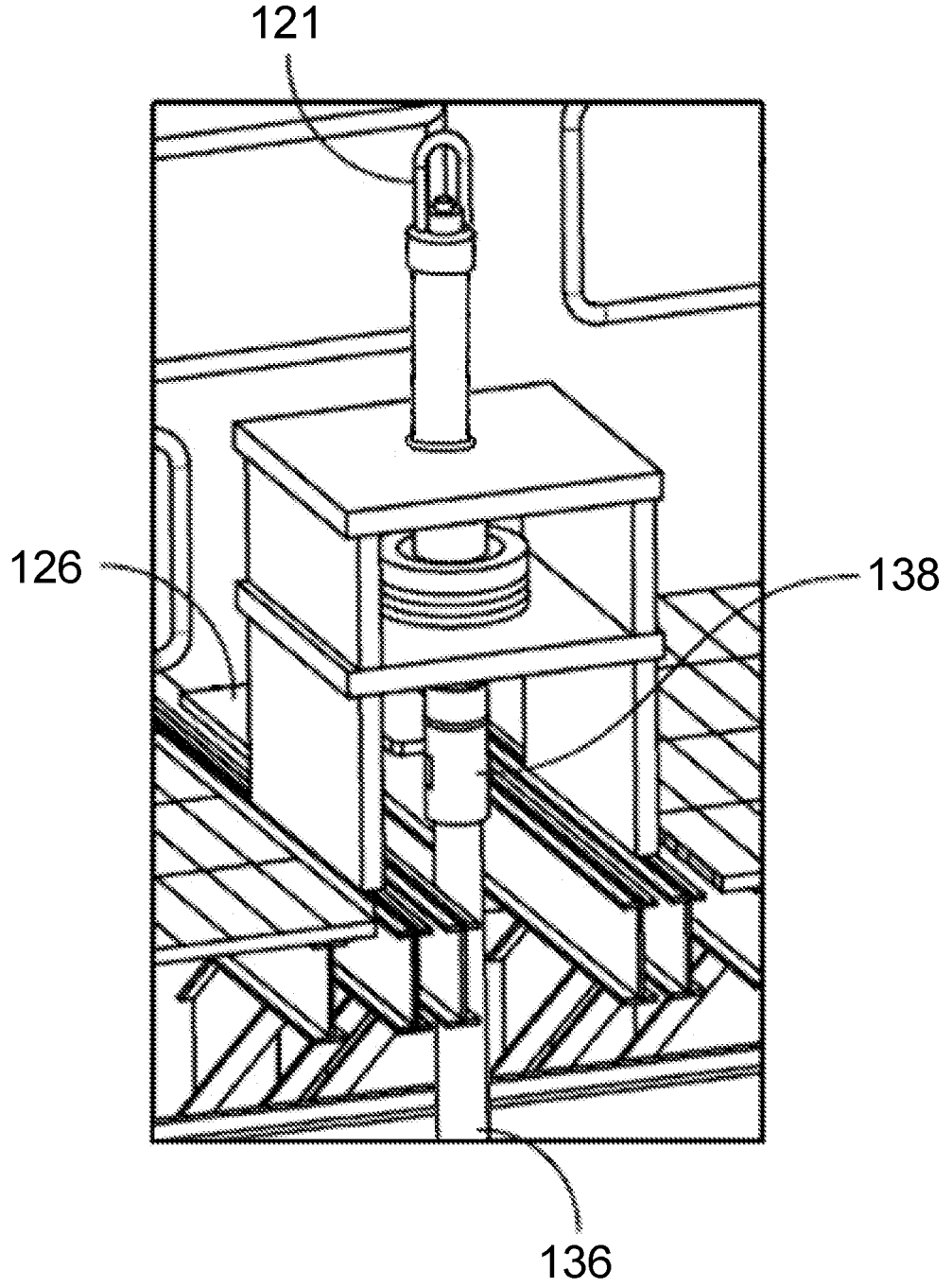
FIG. 11 depicts a method of elongating a lower shaft assembly of the towed array test rotator platform of FIG. 1.

As shown in FIG. 11, the outer collar 138 covers and secures the connection of the pinned drive shaft bearing surface 129 and the shaft linkage 139. An overhead crane (not shown) slightly raises the whole assembly (e.g., power train and the lower shaft assembly 130 with any attached components) from a shaft lifting assembly 121 to unload and allow removal of a freed support plate 126. The whole assembly is then lowered from the shaft lifting assembly 121 back down onto the support plate 126.

Figure 12:
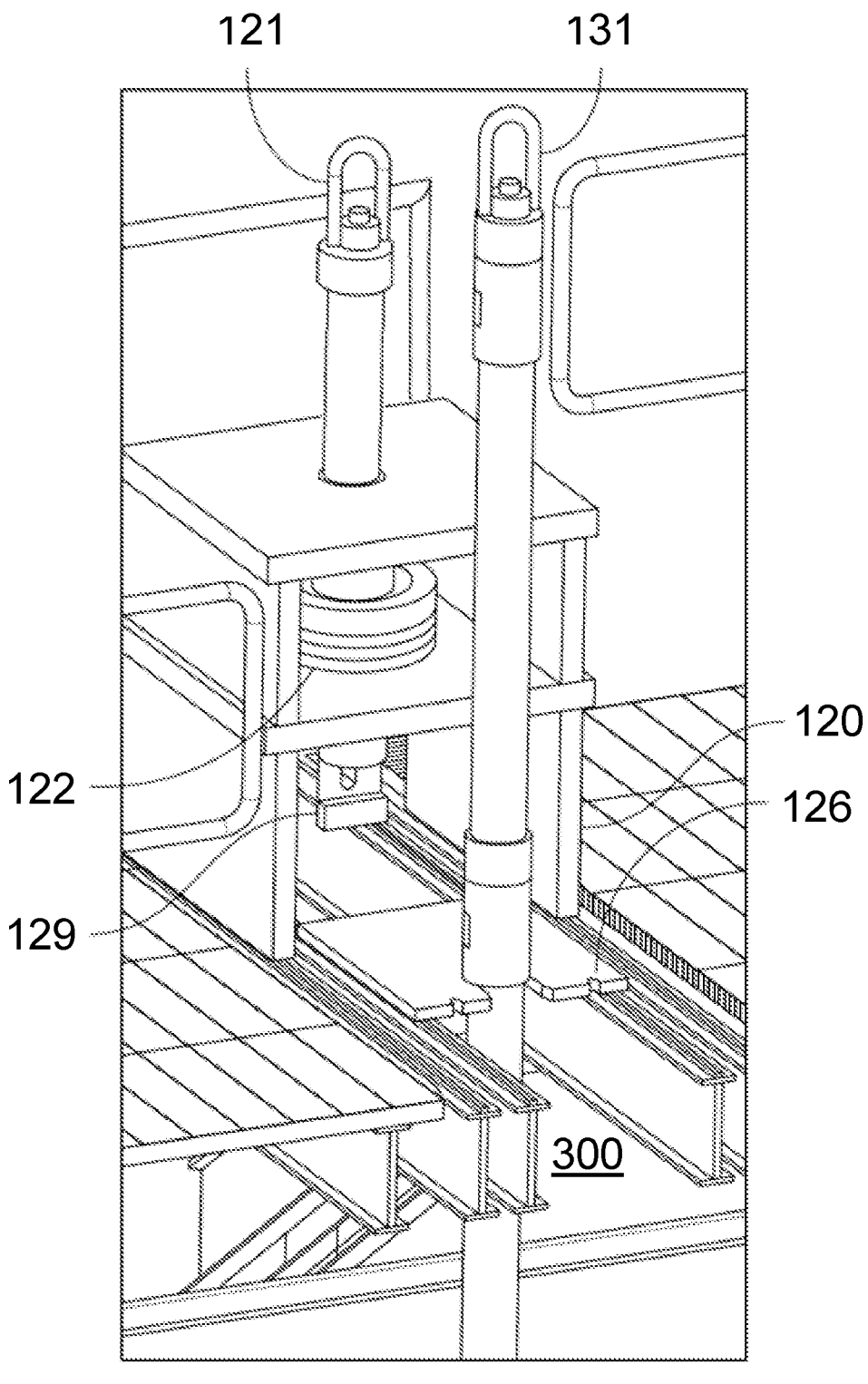
FIG. 12 depicts a front view of the towed array test rotator platform of FIG. 1 in a first state of elongated lower shaft assemblies.

The lower shaft assembly 130 is responsible for providing the proper distance for the cage assembly 140 off the bottom of the tank 102 and for containing the towed array (as carried by the cage assembly 140) in a way that does not impede the telemetry function. As shown in FIG. 12, using the guide rail system 111 to slide the motor-table assembly 120 (carrying the motor 122 and the drive shaft 123) away from the lower shaft assembly 130 allows adding of separable shaft sections 132, 134 to the lower shaft assembly 130 as the lower shaft assembly hangs from the support plate 126 (e.g., adjacent shaft sections connected coaxially with respective shaft linkages 139 that connect to the respective ends of the inner shaft sections 132, 134, 136 using a pinned connection with a welded seam on the outside).

The attachment of a shaft lifting assembly 131 to a new uppermost shaft section allows lowering of the now extended lower shaft assembly 130 through the void 300 to establish a new test height for the attached cage assembly 140, without removing the cage assembly and any attached towed array(s) under test from the water-filled tank 102.

Figure 13:
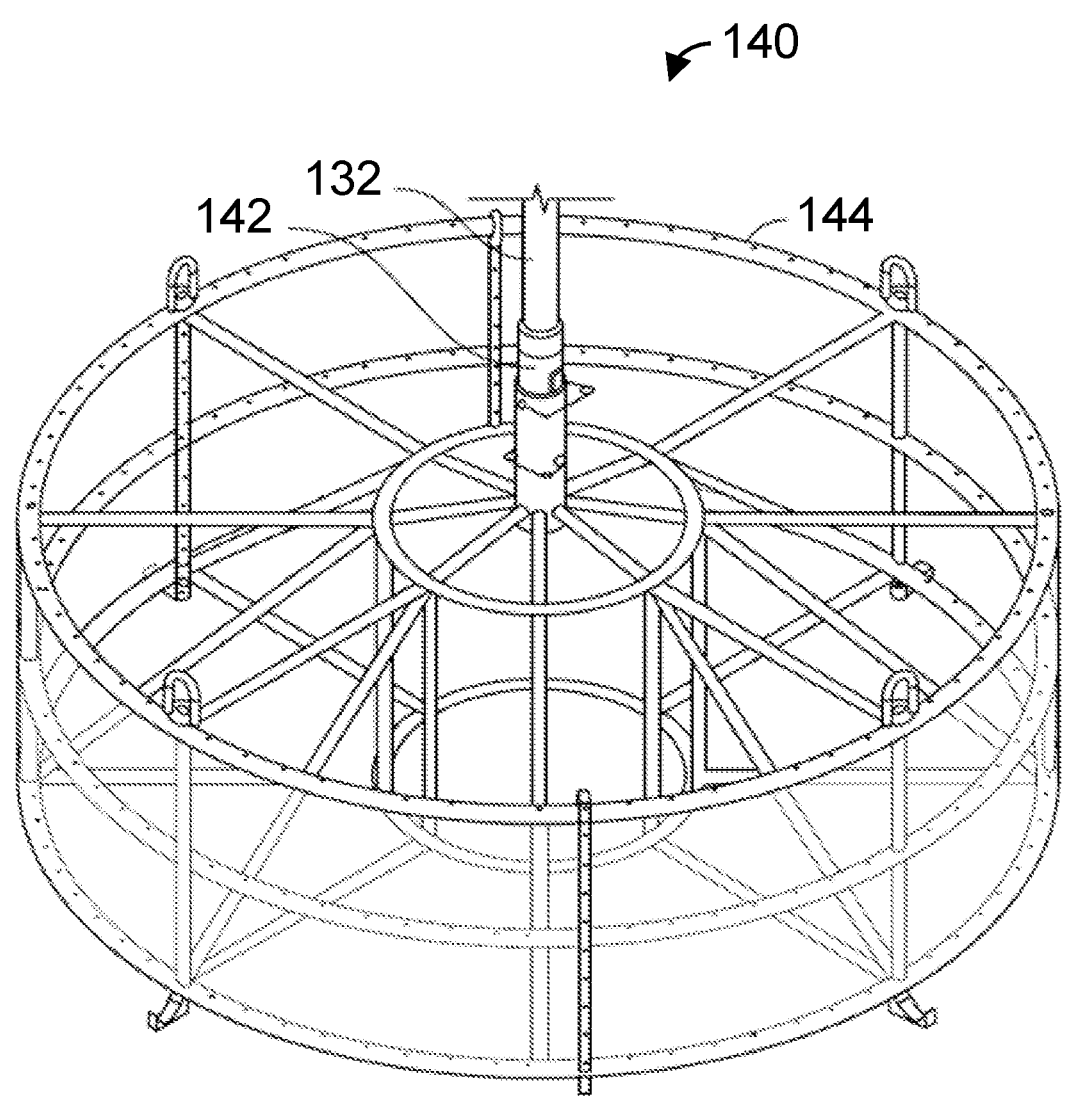
FIG. 13 depicts a top perspective view of a cage assembly of the towed array test platform of FIG. 1.

Referring to FIG. 13, the cage assembly 140 carries the towed array being calibrated and, in certain embodiments, is constructed as a cylindrical test fixture 144 of parallel positioned hollow circular tubes joined by vertical supports and covered with a wire mesh capable of being substantially open to acoustic waves. The height of the cylindrical test feature 144 may be defined by vertical supports. Wrapping the towed array being tested around the cylindrical test feature 144 creates positional predictability for the unit under test.

The cage assembly 140 includes a cage transfer shaft 142 that mechanically mounts coaxially to the connecting shaft section 132. The cage transfer shaft 142 features a welded sleeve that fittedly receives the terminating end of the lower shaft assembly 130 (optionally connecting to the shaft section 132 using two orthogonal through-pins). So assembled, the power train transfers rotational force from the motor 122 through the drive shaft 123 and, in turn, through the shaft section(s) 132, 134, 136 of the lower shaft assembly 130 to the cage transfer shaft 142 of the cage assembly 140.

The towed array test rotator platform for acoustic calibration of towed arrays supports calibration of multiple arrays simultaneously; utilizes existing calibration facilities; is compatible with line arrays of varying diameter; allows for adjustable depth based upon test requirements; provides test personnel with an ease of access to critical components of the test setup; provides accurate and repeatable rotation for large diameter cages and in small increments for calibration purposes; provides an ease of test setup and breakdown (e.g., employs shaft sections light enough for two people to add or remove as needed); provides standardization benefits (e.g., shaft sections are machined with the same interlocking geometries).

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A rotator platform for calibration of a towed array in a water-filled tank, said rotator platform comprising:

a catwalk assembly having a support base with a guide rail system with a substantially-central void formed in the support base, the support base having at least one sliding track positioned proximate to the substantially-central void;

a motor assembly having a motor table moveably carried by said guide rail system and configured to carry a power train including a motor mechanically fixed to a drive shaft; and a lower shaft assembly with at least one shaft section configured to mechanically mount coaxially at a starting end to said drive shaft and capable of projecting from said motor assembly through the substantially-central coid.

2. The rotator platform in accordance with claim 1, wherein said at least one shaft section of said lower shaft assembly further comprises a shaft linkage configured to mechanically mount to a drive shaft bearing of said drive shaft of said power train.

3. The rotator platform in accordance with claim 2 further comprising:

a cage assembly configured to carry the towed array; and a cage transfer shaft joined to said cage assembly and configured to mechanically mount coaxially to said at least one shaft section at a terminating end of said lower shaft assembly opposite said starting end.

4. The rotator platform in accordance with claim 3, wherein said power train is configured to transfer rotational force from said motor through said drive shaft and through said at least one shaft section of said lower shaft assembly to said cage transfer shaft of said cage assembly.

5. The rotator platform in accordance with claim 1, wherein said at least one sliding track of said guide rail system further comprises a plurality of locking cars adjustably mounted upon a plurality of linear rails mechanically fixed along opposing sides of the substantially-central void of said catwalk assembly.

6. The rotator platform in accordance with claim 5 further comprising a support table moveably carried by an innermost pair of said plurality of linear rails of said guide rail system and configured to carry said lower shaft assembly as mechanically removed from said drive shaft and projecting from said motor assembly through the substantially-central void of said catwalk assembly.

7. The rotator platform in accordance with claim 1, wherein said catwalk assembly further comprises a plurality of structural supports mounted above the water-filled tank.

8. A method of operating a rotator platform for calibration of a towed array in a water-filled tank, said method comprising the steps of:

mounting a support table moveably on at least one sliding track of a guide rail system of a catwalk assembly at a first position proximate to a substantially-central void in a support base of said catwalk assembly;

mounting a motor assembly moveably on the at least one sliding track of the guide rail system at a second position separate from the substantially-central void in the support base;

mechanically mounting a cage transfer shaft of a cage assembly coaxially to a terminating end of at least one shaft section of a lower shaft assembly; and receiving, using the support table, the at least one shaft section of the lower shaft assembly at a starting end of the at least one shaft section opposite the cage assembly.

9. The method in accordance with claim 8, said method further comprising the step of deploying, using a shaft lifting assembly of the lower shaft assembly, the at least one shaft section onto the support table at the first position.

10. The method in accordance with claim 9, said method further comprising the steps of:

repositioning a motor table of the motor assembly along the at least one sliding track of the guide rail system to the first position proximate to the substantially-central void; and mechanically mounting, using a power train carried by the motor assembly and characterized by a motor mechanically fixed to a drive shaft, a shaft linkage of the at least one shaft section to a drive shaft bearing of the drift shaft.

11. The method in accordance with claim 10, said method further comprising the steps of:

coaxially lifting, with respect to the motor table, the power train, the lower shaft assembly, the cage assembly to unload the support table; and repositioning the support table along the at least one sliding track of the guide rail system to a third position separate from the substantially-central void.

\*    \*    \*    \*    \*